Patented June 5, 1951

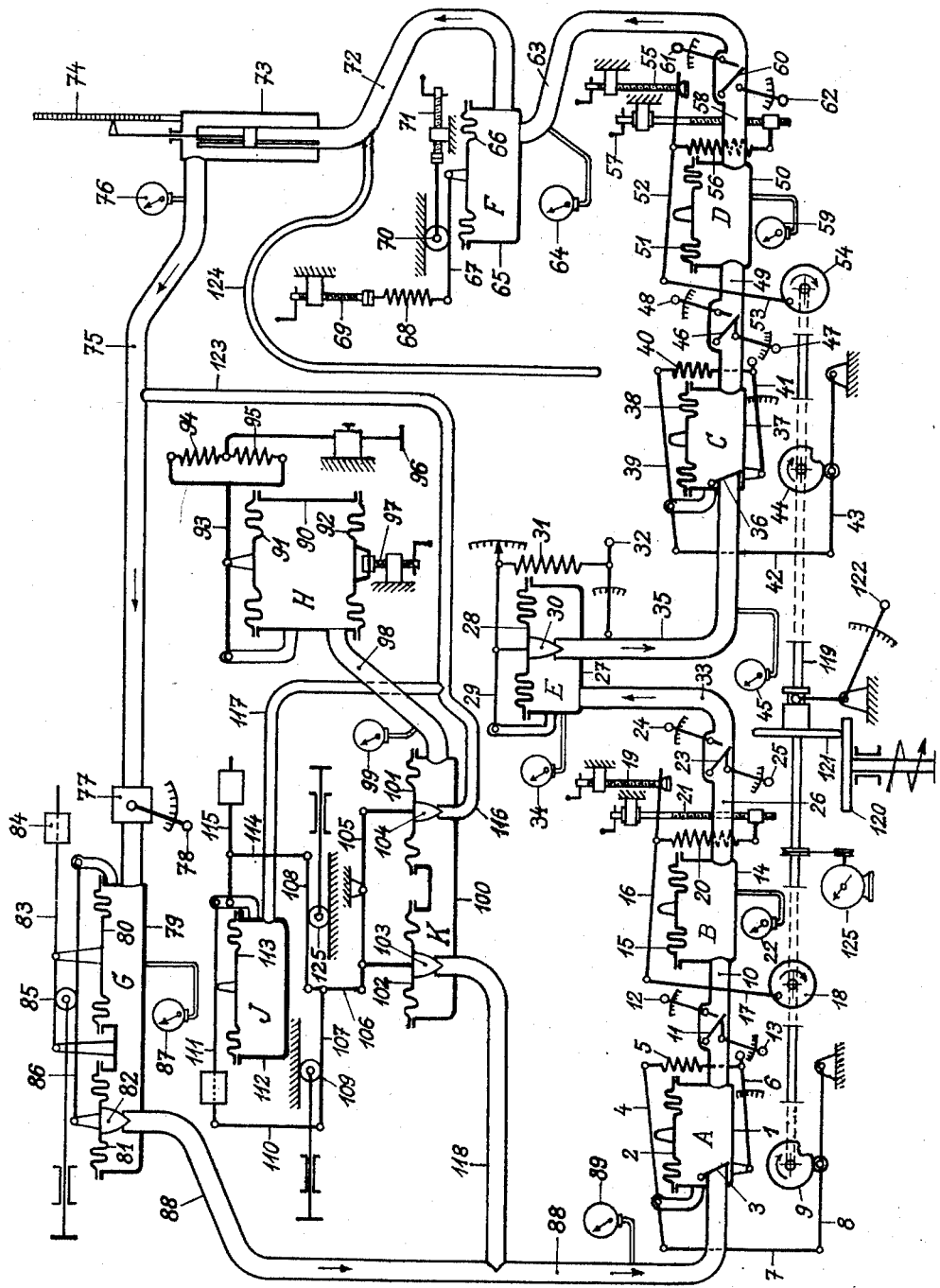

2,556,043

UNITED STATES PATENT OFFICE 2,556,043

MEANS FOR ARTIFICIALLY REPRODUCING THE ACTIONS OF THE HEART AND BLOOD CIRCULATION AND THE FACTORS CONTROLLING THE SAME

Erich Roucka, Brunn, Czechoslovakia

Application September 30, 1948, Serial No. 52,114
In Czechoslovakia April 4, 1948

15 Claims. (Cl. 35—17)

The circulation of the blood in human beings and animals corresponds in hydro-mechanical respect to the flowing of a liquid in a very complicated circulatory system which is affected by various physiological and pathological factors. The complexity of the system makes it very difficult exactly to follow the individual and manifold combined influences which have an effect on the flow; yet an accurate knowledge as to how they are associated with one another is of the greatest importance for the understanding of the numerous physiological and pathological phenomena. Many diseases make themselves evident directly or indirectly in the form of definite hydro-mechanical features of the circulation of the blood and the true appreciation of these features is a valuable auxiliary means for the diagnosis.

According to the present invention the problem of reproducing the natural circulation of the blood in hydro-mechanical respect is solved by the use of a flow of liquid in an artificial circulatory system, wherein for the imitation of the different components of the mechanism influencing the circulation of the blood and including the physiological and pathological factors adjustable mechanical devices are employed, the hydro-mechanical influences of which upon the flow of the artificial circulation are equivalent to the action of the components and factors to be reproduced upon the natural circulation of the blood. The artificial circulatory system is provided with devices for determining the hydro-mechanical values and enables the action of the different influences upon the flow to be observed either separately or in various combinations. In this way a medical student is enabled to get conviently a clear idea, even in complicated cases, as regards the hydro-mechanical process by tests repeated as frequently as desired, while selectively altering the conditions, and in this way clearly grasp the relationship between them, of which he could not otherwise obtain a clear picture.

The essence of the invention is hereinafter described with reference to the accompanying drawing which illustrates diagrammatically and by way of example one mode of carrying the invention into effect.

The apparatus essentially consists of: four pulsation pumps A, B, C, D, arranged in series with one another, which pumps represent the heart; a device E inserted between the pumps B and C and representing the lung; a device F representing the elasticity of the arteries; a device G which imitates the peripheral circulation of the blood; a device H corresponding to the blood collectors, which device is associated with regulating devices J, K; and pipes which connect the said devices together in a suitable manner.

The pump A, which corresponds to the right-hand ante-chamber of the heart, is constituted by a container 1 closed at the top by a freely movable diaphragm 2 provided at its centre with a rigid flat portion and a projection. The pipe 88 opening into this container and corresponding to the return of the blood through the veins is adapted to be closed by a flap valve 3 which opens in one direction only, the same representing valves of the veins. A lever 4 pivoted on a fixed axle is connected at its left-hand end by means of a rod 7 to the lever 8 carrying a roller which abuts against a cam 9 mounted on the shaft 119, the right-hand end of the lever 4 being connected to a spring 5 which hangs on to an adjustable control lever 6.

The cam 9 is provided with a tooth-like recess and is driven from a motor (not shown) through the intermediary of a friction drive 120, 121 and 122 and through a shaft 119.

A pipe 10 containing a flap valve 11 representing the "trienspidalis" leads from the pump A to the pump B; the deflection of the valve can be adjusted as desired by means of adjusting levers 12 and 13.

The pump B corresponds to the right-hand chamber of the heart. The same consists of a container 14 which is closed at the top by a freely movable diaphragm 15. A lever 16 supported at its right-hand end by the adjusting screw 19 is connected by means of a rod 17 to the crank disc 18 which is driven synchronously with the cam 9. The spring 20, the tension of which can be regulated by means of an adjusting screw 21, tends to press the right-hand end of the lever 16 downwards. A manometer 22 is connected to the container 14. During its oscillating movement the lever 16 presses the diaphragm 15 more or less downwards according as to how high the latter has been lifted up from the liquid contained in the container 14, thus pumping the corresponding amount of liqiud, depending upon the degree of filling, into the pipe 26.

The pipe 26 is provided with a non-return flap valve 23 co-operating with adjusting levers 24 and 25, which limit the deflection of the valve in both directions. The valve 23 represents the "pulmonalis."

A pipe 33 leads to the device E which represents the lung. This device consists of a container 27 which is closed at the top by a loose diaphragm 28. The latter is connected to a lever 29 which is loaded by a spring 31, the tension of which can be varied by means of an adjusting lever 32. The diaphragm 28 supports the valve member 30 which throttles more or less the outlet opening of a pipe 35 of the container 27. The deflections of the lever turning around its left-hand end can be read on a corresponding scale. A pipe 35 provided with a manometer 45 leads into the pump C representing the left-hand ante-chamber of the heart. The construction of this pump is the same as that of the pump A. Like the latter it comprises a container 37, a diaphragm 38, a lever 39, a rod 32, a lever 43 provided with a roller, a cam 44, a spring 40, an adjusting lever 41 and a non-return flap valve 36.

The pump D representing the left-hand chamber of the heart is connected to the pump C by means of a pipe 49.

The pipe 49 encloses a non-return flap valve 46 with adjusting levers 47 and 48 for the limitation of the stroke; this valve represents the "mitralis."

The construction of the pump D and its function are the same as those described with reference to the pump B. It comprises a container 50, a diaphragm 51, a lever 52, a rod 53, a crank disc 54, adjusting screws 55, 57, a spring 56, a manometer 59 and an outlet pipe 58. The latter is provided with a non-return valve 60 associated with means 61, 62 for limiting the stroke. This valve represents the valve of the aorta.

A pipe 63 with a manometer 64 proceeds from beyond the non-return valve 60 to the device F which serves for the demonstration of the varying elasticity of the arteries. The device F consists of a container 65 closed by a resilient diaphragm 66. A lever 67 is connected to the latter and its left-hand end is pulled upwards by a spring 68. The tension of the latter can be adjusted by means of a screw 69. The lever 67 abuts against a roller 70 which can be displaced in the longitudinal direction of the lever 67 by means of an adjusting screw 71.

A pipe 72 proceeds from the device F to a device for measuring the amount of the flowing liquid or the speed of flow. This measuring device consists of a piston which is displaceable in the longitudinal direction of a slotted cylinder and is provided with an index movable along a scale 74.

In a further pipe 75 leading to the device G there is inserted a manometer 76 and a valve 77 which can be adjusted with respect to a scale by means of a lever 78.

The device G intended to represent the peripheral circulation of the blood consists of a container 79 provided with two openings closed by diaphragms 80 and 81. The diaphragm 81 carries a valve 82 which throttles more or less the opening of a pipe 88 and is connected with a lever 83 which is pivoted around its left-hand end and is loaded by a weight 84. Between the lever 83 and 86 there is inserted a displaceable roller 85. The container 79 is provided with a manometer 87. The pipe 88, provided with a manometer 89, leads from the device G back to the pump A above described, whereby the main cycle is closed.

A rubber tube 124 is connected to the pipe 72 by means of which tube the pulsating flow is observed by the sense of touch, in the same way as in the case of feeling the pulse.

A pipe 123 branches off the pipe 75 and is divided into two branches 117 and 116 leading respectively to the devices J and K representing the regulators of the blood collectors.

The device K consists of a container 100 having two openings which are closed by diaphragms 101 and 102. Each one of these carries a valve, which valves are secured to a common balancing beam 105. A valve 103 throttles the opening of a pipe 118 and a valve 104 throttles the opening of the pipe 116. When one of these valves is closed the other one opens. Two levers 107 and 108 are articulated to the left-hand end of the balancing beam 105 by means of a rod 106. The lever 107 abuts against a displaceable roller 109 and is connected by means of a rod 110 to the left-hand end of a lever 111 which pivots around its right-hand end and is loaded by a weight. This lever is supported on the diaphragm 113 which covers the container 112, the pipe 117 branching off the pipe 123 opening therein. The right-hand end of the lever 108 resting on the displaceable roller 125, is connected to the lever 115 by means of a rod 114, the lever 115 being pivoted at its left-hand end and loaded with a weight.

A pipe 118 leads from the device K to the pipe 88. A pipe 98 opens into the device K, which pipe is provided with a manometer 99 and proceeds from the device H representing the blood collector.

The device H consists of a container 90 closed at the top by a diaphragm 91 and at the lower end by a diaphragm 92. A lever 93 is articulated to the diaphragm 91 and is pivoted at its left-hand end. Its right-hand end is forked and is suspended by means of springs 94, 95 to the end of a displaceable adjusting rod 96.

The circulatory system hereinbefore described is completely filled with liquid and operates as follows: The speed of the cams 9 and 44 and of the crank discs 18 and 54, which are driven by the common shaft 119, is adjusted to the desired number of revolutions by means of the lever controlling the friction gear 120, 121, which number of revolutions can be read on the tachometer 125 calibrated to the number of pulses per minute. The liquid arriving in the pump A through the pipe 88 and the non-return valve 3 is driven by the oscillatory movement of the lever 4 and the movements of the diaphragm 2 into the pipe 10 whence it passes past the lifted up valve 11 into the pump B. It is necessary to point out that the diaphragm 2 is not capable of sucking liquid into the container 1 and that the liquid has to enter into the container 1 under a certain pressure. It then depends upon the amount that has penetrated into the container how high the diaphragm 2 is lifted and to what extent it is pressed down when the lever 4 moves downwards. When the filling of the container 1 is small the amount fed by the pump is also small and vice versa. The downward pressing force of the lever 4 is dependent upon the tension of the spring 5, which can be adjusted by means of the adjusting lever 6. By reducing this tension the fatiguing of the heart muscle can be imitated, which is no longer sufficiently strong for the normal reverse pumping of the blood from the right-hand ante-chamber A into the right-hand heart chamber B.

The insufficient closing ability of the non-return valve 11 representing the "trienspidalis" can be demonstrated by so adjusting the lever 13 that it prevents the complete closure of the valve. This means that at the systole of the chamber B there is a partial return flow through the valve 11 into the ante-chamber A. Also "stenosis" can be imitated, which owing to a degeneration of the valve renders the normal flow through the same impossible. For this purpose use is made of the adjusting lever 12 which limits the opening of the valve 11 according to the adjustment.

Immediately after the liquid has been driven into the container 14, and the diaphragm 15 has been lifted up according to the amount of liquid, the crank disc 18 begins to pull the lever 16 downwards, which sooner or later abuts against the projection of the diaphragm 15 and begins to press the same downwards, thereby causing the liquid to be pressed out of the container 14 into the pipe 26. In order to be able to vary the time within which the lever 16 presses on the diaphragm 15 and thereby enable the changes in the elasticity of the heart muscle to be demonstrated as well as its ability to take up different amounts of blood and reverse the pumping during the systole, the height of the right-hand end of the lever 16 is adapted to be adjusted by means of screws 19. It is clear that the amount of liquid that is fed is the smaller the higher the right-hand end of the lever 16 is lifted up.

Any damage done to the heart muscle by infection causing its pumping force to be reduced can be imitated by means of the adjusting screw 21 and spring 20, the tension of which determines the value of the pressing force of the lever 16 against the diaphragm 15. If the tension of the spring 20 is small the right-hand end of the lever 16 is more or less lifted up during the feeding stroke so that the diaphragm 15 is pressed downwards less than previously, with the result that the amount fed is reduced.

The non-return valve 23 in the pipe 26 represents the "pulmonalis." The insufficient opening and closing of this valve can be demonstrated by means of the adjusting levers 24 and 25, as has been described above with respect to the valve 11.

The device E representing the lung throttles the flow of the liquid by means of the valve 30 to the extent that the tension of the spring 31 has been adjusted by means of the lever 32, which spring loads the lever 29 together with the diaphragm 28 and thereby also the valve 30. The throttling which thus occurs at the mouth of the pipe 35 corresponds to the resistance of the flow through the lungs. By varying the tension of the spring 31 different high pressures in the lung can be imitated.

The liquid then flows through the pipe 35 and through the valve 36 into the pump C corresponding to the left ante-chamber of the heart and whence it flows through the pipe 49, past the valve 46 representing the "mitralis," into the pump D corresponding to the left heart chamber, leaving it through the pipe 58, past the non-return valve 60 representing the valve of the aorta. All these devices work in a similar way and enable similar processes as those already described with reference to the devices A, 11 and B to be demonstrated.

The device F into which the liquid flows through the pipe 63 represents the effects of the varying elasticity of the arteries. As is known, the arteries of a child show a maximum and those of a sclerotic old person a minimum of elastic resiliency. This can be demonstrated by adjusting the roller 70 by means of the screw 71 and by varying the tension of the spring 68 by means of the screw 69. By displacing the roller 70 to the left and at the same time tensioning the spring 68 to such an extent that the medium pressure on the diaphragm 66 seems to be balanced, this diaphragm will be caused to effect, with given pressure variations, oscillations of maximum amplitude corresponding to the arteries of a child. On the other hand if the roller 70 is displaced as far as possible to the right and the tension of the spring 68 is reduced to such an extent that the minimum liquid pressure on the diaphragm 66 appears to be balanced, the diaphragm will effect, for the same pressure variations, minimum amplitudes of oscillations corresponding to the smaller elasticity of the arteries of old persons.

From the pipe 72 there is branched off behind the device F a tube 124, the elastic walls of which are tensioned strongly or weakly by the pulsating flow in the pipe 72, so that it is possible to follow the flow by the sense of touch in the same way as the pulse is felt in connection with the natural circulation of the blood.

The device 73 for measuring the speed of flow which is inserted in the pipe 72 behind the device F works as follows: Its piston, provided with an index and sliding in the cylinder provided with a longitudinal slot, is lifted at different heights according to the speed of flow and these heights are read on the scale 74. In this way we also obtain the volume of flow through the pipe 72 per minute.

An important device for demonstration purposes is G which represents the peripheral circulation of the blood. The throttle valve 77, adjustable by means of the lever 78, represents the total of the "arteriols" of the peripheral blood circulation which regulate the flow through the capillaries and the pressure of the blood therein. The container 79 closed by the diaphragms 80 and 81 imitates according to the position of the latter the variable volumes of the capillaries involved in the peripheral circulation. The valve 82 throttles the flow at the mouth of the pipe 88 and represents the total resistance of the capillaries through which the blood passes. The variable resistance and variable volume of the capillaries can be demonstrated by the displacement of the roller 85; the latter enables the position of the valve 82 to be adapted as desired for any position of the diaphragm 80 and therewith the different conditions in the peripheral circulation of the blood to be imitated.

The liquid passing through the valve 82 returns through the pipe 88 to the container 1 of the pump A which corresponds to the venous back flow of the blood in the right-hand ante-chamber of the heart.

In order to enable a circulation of different intensity to be maintained in the circulatory system a storage container is used, the actual liquid content of which does not take part in the circulation but can be momentarily introduced as desired into the circulatory system and is returned therefrom into the container. This storage container H corresponds to the blood collectors present in those devices in which no metabolism takes place that would require a blood circulation of substantial intensity. If the intensity of the circulation, that is to say the volume of the circulating liquid per minute, is to be increased, a definite amount of liquid must be transferred from the device H into the pump A. This may be obtained by causing the rollers 109 or 125 to effect a displacement which would cause a turning of the balancing beam 105 in the clockwise direction.

In this way the valve 103 is opened and the valve 104 closed. Less liquid will then flow through the pipes 123, 116 into the device K past the valve 104 than flows away past the valve 103 through the pipe 118 into the pipe 88. In this way a drop in pressure occurs in the container 100 so that liquid passes from the device H, the filling of which is loaded by the diaphragm 91, lever 93, and springs 94, 95, into the pipe 118 and pipe 88 and therewith into the main cycle of the circulatory system. A similar effect may be obtained by displacement of the rod 96 in a downward direction, which causes a stronger loading of the diaphragm 91 by the springs 94 and 95. By proceeding in the opposite direction one can remove liquid from the circulatory system and effect a storage thereof in the device H, wherefrom the liquid is expelled temporarily from the cycle.

By means of the device J one can imitate the restrainers of the blood pressure which tend to maintain a desirable value of blood pressure in the organism by changing the vasomotoric tone through the nervous system. The pressure in the container 112 corresponding to the "arteriol" pressure is only partially balanced by the weight displaceable on the lever 111 so that the lever 107 is subjected permanently to a turning moment in a clockwise direction and the right-hand end of the lever tends to press the rod 106 downwards. However, the weighted lever 115 turns the lever 108, by means of the rod 114 also in a clockwise direction, so that the left-hand end of this lever tends to lift the rod 106. The ratio of the two forces acting in opposite directions and therewith also their resulting effect on the lever 105 can be adjusted as desired by a displacement of the rollers 109, 125.

The adjustability of all the mechanical devices hereinbefore referred to enables one faithfully to imitate in hydro-mechanical respect the influence of the most different components of the organism as well as the physiological and pathological factors upon the blood circulation.

It is to be understood that the apparatus hereinbefore described is only given by way of example. So far as only the representation of a few fundamental processes of the natural blood circulation is concerned the apparatus can be simplified by dispensing with some of the described devices. On the other hand, it is possible to increase the range of possible demonstrations by the insertion of further devices which copy in hydro-mechanical respect certain components of the organism or different effects.

I claim:

1. In an apparatus for artificially imitating the actions of the heart and of the blood circulation, in combination, a circulatory pipe; a circulating liquid; a pulsating pump fed exclusively by said circulatory pipe and having a variable rate of delivery; and adjustable resistance to circulation arranged in said circulatory pipe in series to said pump; a container for a liquid; branch pipes connected to said circulatory pipe before and behind said resistance, respectively, and leading to said container; control means in said branch pipes; and means for adjusting said control means so as to enable the liquid to flow from said circulatory pipe into said container and vice versa according to the position of said control means under the action of said adjusting means whereby the amount of liquid flowing to said pump and the rate of delivery of said pump is varied.

2. Apparatus for artificially imitating the action of the heart and of blood circulation, comprising in combination, a circulatory system; a circulating liquid; a pumping system for the imitations of the actions of the heart including four pulsating pumps connected in series with one another in said circulatory system, the first and third pulsating pump representing the right-hand and left-hand ante-chambers of the heart respectively, the second and fourth pulsating pump representing the right-hand and left-hand chambers of the heart respectively; each pump including a container having a freely movable wall adapted to assume a position dependent on the amount of liquid present in said container; a pulsating driving member acting on said movable wall during the downward stroke only, and adapted to press downward said movable wall for a distance variably depending on the position of said movable wall, and consequently on the amount of liquid present in said container; adjusting means for said pulsating driving member for imitating various heart conditions; four adjustable spring means, each urging one of said pulsating driving members downwards; means for separately adjusting the tension of each of said spring means for representing changes of the heart muscle; a housing; a shaft rotatably supported in said housing; drives means rotating said shaft; variable transmission means operatively connecting said drive means to said shaft; a first cam means rigidly secured to said shaft and operatively connected to the driving member driving said first pulsating pump so as to impart short upwardly directed impulses to it; a second cam means rigidly secured to said shaft and operatively connected to the driving member driving said third pulsating pump so as to impart short upwardly directed impulses to it; a first crank means rigidly secured to said shaft and operatively connected to the driving member driving said second pulsating pump so as to impart working strokes of longer duration to it; a second crank means rigidly secured to said shaft and operatively connected to said fourth pulsating pump so as to impart working strokes of longer duration to it; and non-return flap valves inserted between each two of said pumps, each of said flap valves corresponding to a heart valve.

3. Apparatus as claimed in claim 2, in which said adjusting means of said driving members of said movable walls include means for adjusting the length of the effective stroke of said pump for the purpose of representing the changes of the volume of the systole.

4. Apparatus as claimed in claim 2, including means for adjusting the stroke of said non-return flap valves for the purpose of representing an insufficient closure and a stenose of the valves of the heart.

5. Apparatus as claimed in claim 2, including a device representing the "haemo-dynamic" operation of the lung, said device being inserted in said circulatory system between said second and said third pump and including a container having a movable wall, a valve supported on said wall, a loading member for driving said valve into throttling position, said device being adapted to act in opposition to the fluid pressure in said container, and means for adjusting the said loading member for the purpose of representing those influences which alter the blood pressure in the lung.

6. Apparatus as claimed in claim 2, including a device representing the variable elasticity of the arteries, said device being inserted in said circulatory system and including a container having a movable wall and adjusting means for varying the elastic resiliency of said wall with respect to the pressure variations in said container.

7. Apparatus as claimed in claim 1, including a measuring device for measuring the rate of the flowing liquid.

8. Apparatus as claimed in claim 1, including a measuring device for measuring the pressure of the flowing liquid.

9. Apparatus as claimed in claim 1, and a measuring device including a tube having elastically resilient wall connected on to said circulatory system for ascertaining the changes in the conditions of flow by the sense of touch.

10. Apparatus as claimed in claim 1, including a device representing the peripheral circulation of the blood in the circulatory system, said device including an elongated container disposed in said circulatory pipe and having two movable walls; a throttling valve controlled by one of said two movable walls and disposed in the portion of said circulatory pipe connecting said elongated container with said pulsating pump for controlling the flow of said circulatory liquid in said circulatory pipe; manually operated means for adjusting the position of said throttling valve independently of the position of said movable wall controlling the action of said valve, said manually operated means being arranged to act also on the other of said movable walls.

11. Apparatus as claimed in claim 10, said means for moving said valve including a first lever articulated to said valve and having a fixed pivot, a second lever having a fixed pivot, a loading member on said second lever, and an adjustable loading member between said two levers.

12. Apparatus as claimed in claim 1, comprising a device representing the variable elasticity of the arteries, said device being disposed in said circulatory system and including a container having a movable wall and adjusting means for varying the elastic resiliency of said wall with respect to the pressure variations in said container; said adjusting means including a lever articulated to said movable wall, a supporting member for said lever, a spring loading said lever, means for adjusting the position of said supporting member with respect to said lever, and means for varying the tension of said spring; and an adjustable throttle member inserted in said circulatory system in front of said container.

13. In an apparatus for artificially imitating the actions of the heart and of the blood circulation, in combination, a circulatory pipe; a circulating liquid; a pulsating pump fed exclusively by said circulatory pipe and having a variable rate of delivery; an adjustable resistance to circulation arranged in said circulatory pipe in series to said pump; a storage container for the reception of a variable content of liquid expelled from said circulatory system and its reintroduction therein according to requirements; a pipe for transferring said liquid from said storage container to said circulatory system and vice versa; and means for controlling the transfer, the storage container having a movable wall, and a loading member on said wall.

14. In an apparatus for artificially imitating the actions of the heart and of the blood circulation, in combination, a circulatory pipe; a circulating liquid; a pulsating pump fed exclusively by said circulatory pipe and having a variable rate of delivery; an adjustable resistance to circulation arranged in said circulatory pipe in series to said pump; a storage container for the reception of a variable content of liquid expelled from said circulatory system and its reintroduction therein according to requirements; a pipe for transferring the liquid from said storage container to said circulatory system and vice versa; means for controlling the transfer, the storage container having a first movable wall, a loading member on said first movable wall, a second movable wall, and an adjusting member for said second movable wall.

15. In an apparatus for artificially imitating the actions of the heart and of the blood circulation, in combination, a circulatory pipe; a circulating liquid; a pulsating pump fed exclusively by said circulatory pipe and having a variable rate of delivery; an adjustable resistance to circulation arranged in said circulatory pipe in series to said pump; a storage container for the reception of a variable content of liquid expelled from said circulatory system and its reintroduction therein according to requirements; a pipe for transferring the liquid from said storage container to said circulatory system and vice versa; means for controlling the transfer; the storage container having a movable wall, and a loading member on said wall; a regulating member arranged in said pipe and including a container, two valves, one of said valves being adapted to control the flow of fluid from said storage container into said circulatory system, and the other of said valves being adapted to control the flow from said circulatory system into said storage container; a balancing beam being connected at its opposite ends to said two valves; a device for the representation of the blood restrainers, said device including a container having a freely movable wall and connected to a branch of said circulatory system; a device representing the peripheral blood cycle arranged behind said device for the representation of the action of the blood restrainers; means for transferring the liquid pressure in said container to said balancing beam of said regulating member; means adapted to adjust the ratio of the transfer; means for loading said balancing beam by a counter-force tending to turn said beam in opposite direction; and means for adjusting effect of the counter-force on said beam.

ERICH ROUCKA.

REFERENCES CITED

The following references are of record in the file of this patent:

UNITED STATES PATENTS

| Number | Name | Date |
| --- | --- | --- |
| 2,370,710 | Blair | Mar. 6, 1945 |
| 2,389,829 | Tyler | Nov. 27, 1945 |
| 2,391,996 | Muller | Jan. 1, 1946 |
| 2,395,974 | Muller et al. | Mar. 5, 1946 |
| 2,399,520 | Tucker | Apr. 30, 1946 |